United States Patent Office 3,334,265
Patented Aug. 1, 1967

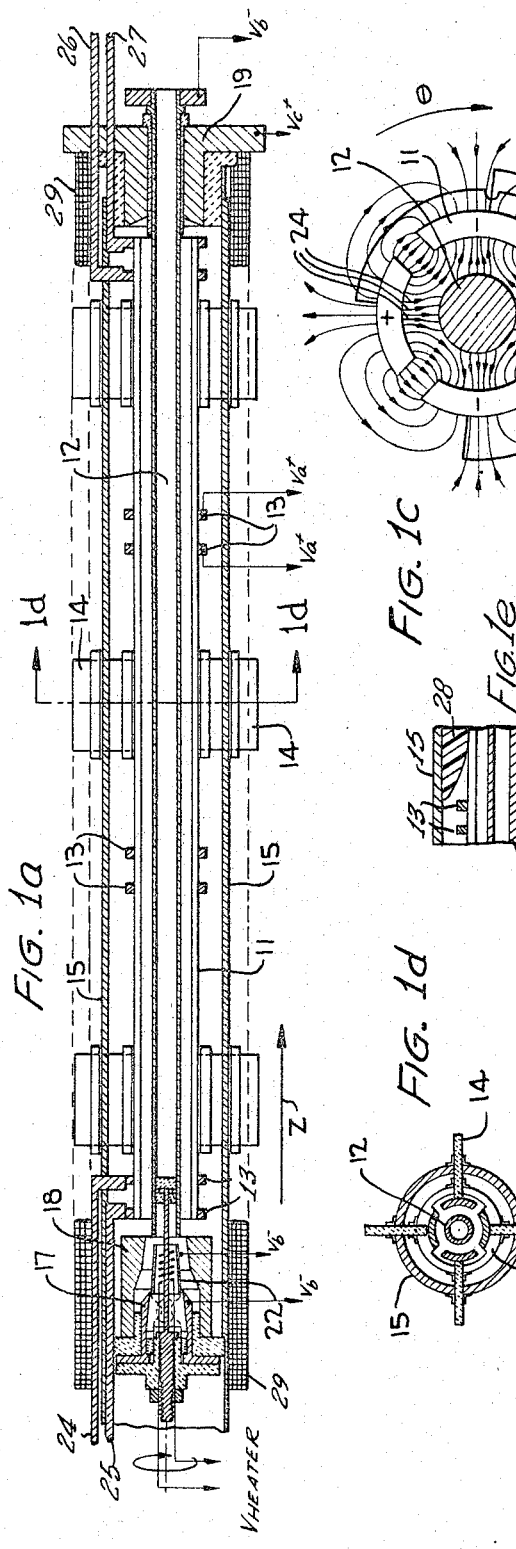
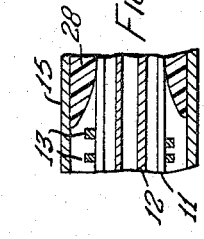
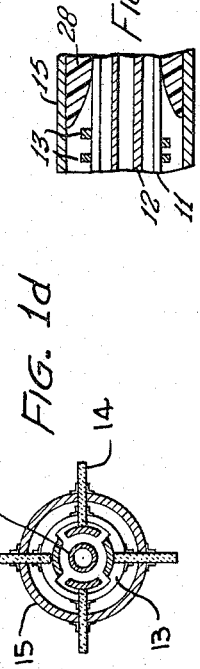
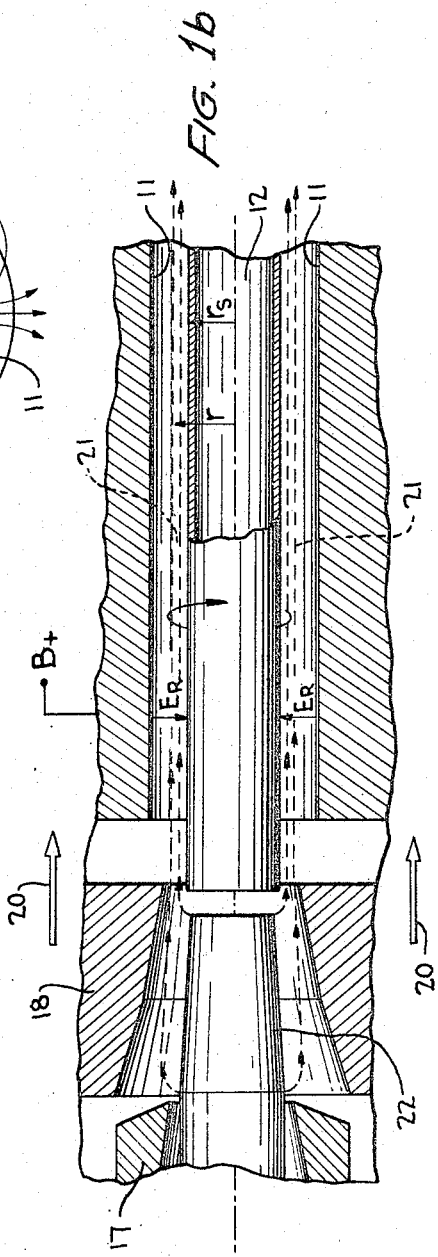

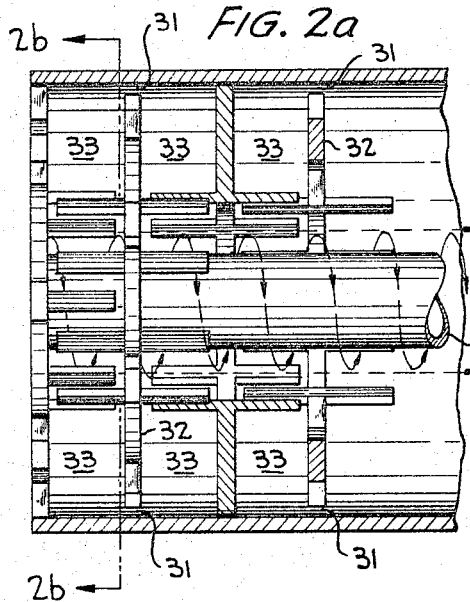
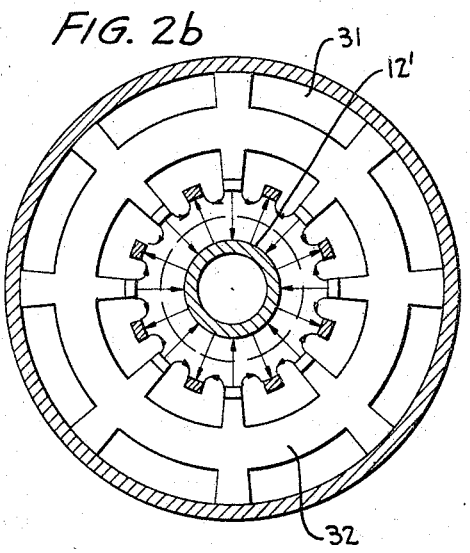
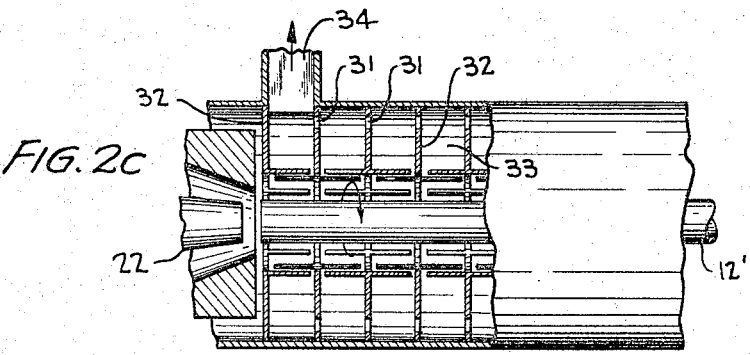
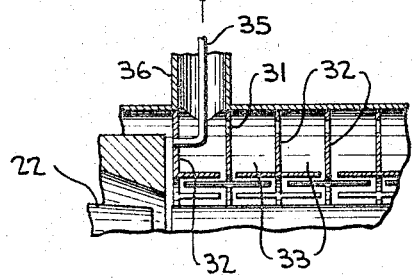
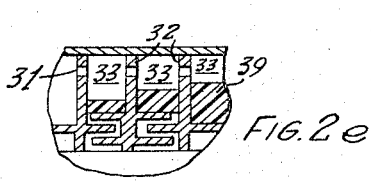

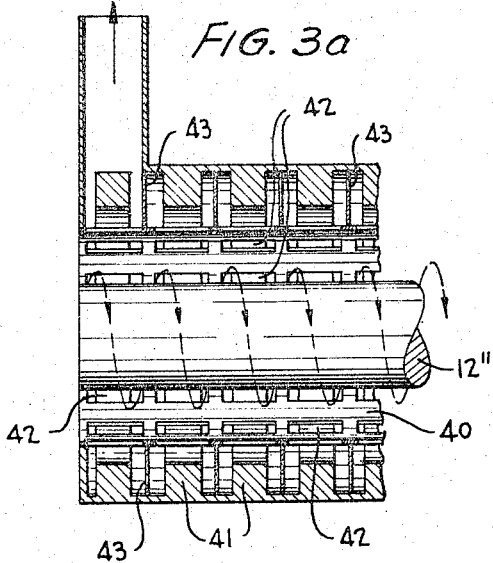
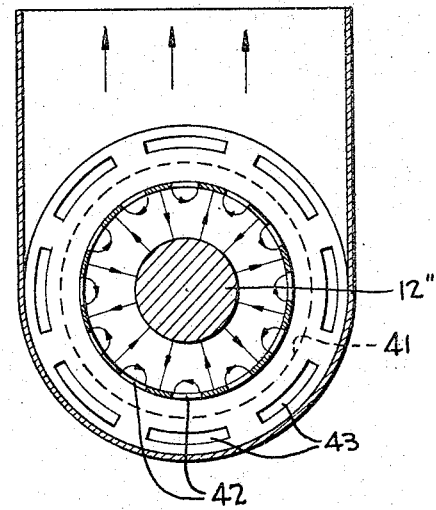
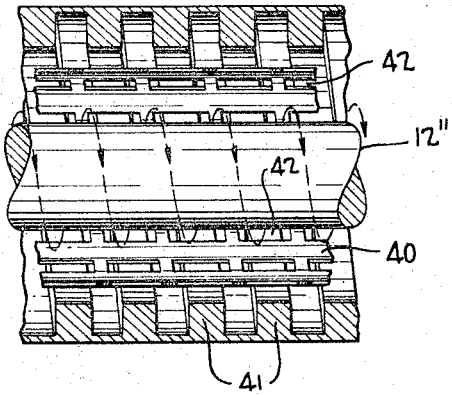

3,334,265
CROSS-FIELD BACKWARD-WAVE OSCILLATOR
Horst W. A. Gerlach, Bethesda, Md., and William E. Waters, Sunnyvale, Calif., assignors to the United States of America as represented by the Secretary of the Army
Continuation of application Ser. No. 140,142, Sept. 22, 1961. This application June 2, 1966, Ser. No. 554,907
4 Claims. (Cl. 315—3.6)

ABSTRACT OF THE DISCLOSURE

This disclosure describes a crossed-field traveling wave tube in which electrons emitted from a conical cathode are constrained by an axial magnetic field and a radial electric field to rotate in a helical path. The cathode structure is designed so that electrons emitted therefrom are geometrically similar; therefore, all electrons in a cross-section of the beam possess the same angular velocity. The R-F structure consists of a zero potential sole surrounded by cylindrically arranged wires connected to operate in the $\pi$ mode. Another R-F structure disclosed consists of a zero potential sole surrounded by a series of resonant cells attached to an interaction interdigital anode. A further R-F structure disclosed consists of a ladder-like transmission line having a plurality of slots therein wrapped around a zero potential sole.

---

This application is a continuation of application Ser. No. 140,142, filed Sept. 22, 1961, and now abandoned.

The invention described herein may be manufactured and used by or for the Government for governmental purposes without the payment to us of any royalty thereon.

This invention relates generally to backward-wave tubes and more particularly to a backward-wave oscillator employing crossed fields in conjunction with an electron beam rotating in a helical path.

A backward-wave oscillator or BWO is essentially an electron tube which converts applied D.C. energy into radio-frequency oscillations. One of the most common prior art BWO's is the O-Carcinotron in which a beam of electrons is directed through holes along the axis of a folded waveguide structure. Alternatively, a hollow cylindrical electron beam may be injected along the axis of a helical delay line. Under suitable conditions, a small portion of the beam's kinetic energy can be delivered to the R-F field of a backward traveling wave. One serious deficiency of this type of BWO is its low conversion efficiency.

Another type of BWO employs a radial D.C. field existing between two concentric circular cylinders, the inner one being at the higher potential, and a focussed thin helical beam of electrons injected into the cylinder spacing. The inward directed electrical force and the centrifugal force are in equilibrium causing the beam to rotate in a prescribed helical path. By longitudinally splitting the inner cylinder, R-F fields are enabled to exist between adjacent sections and energy exchange takes place between these R-F fields and the electrons. In this system, known as the "E-type" BWO, in addition to a portion of the kinetic energy of the electrons being given up to the R-F field, some of the potential energy of the electrons due to their motion through the D.C. radial field is also delivered to the R-F field. The E-type BWO should therefore be more efficient than the O-type, but this expected increase in efficiency has not yet been realized in practice. Two major defects of the E-type BWO contributing to its low efficiency are (1) the R-F structure employed and (2) low beam stiffness.

In the E-type system, the R-F structure is located interiorly of the beam. Thus, improperly injected electrons are not focussed by the system due to its low beam stiffness, will strike the R-F circuit which is in a disadvantageous position to dissipate the generated heat. Consequently, the output power of the system is reduced.

It is therefore an object of this invention to provide a new and improved traveling wave amplifier tube.

It is a further object of this invention to provide a new and improved backward-wave oscillator.

Another object of this invention is to provide a backward-wave tube with a high conversion efficiency.

Yet another object of this invention is to provide a backward-wave tube having high beam stiffness.

The device to be described, called the Rotatron, is immersed in a homogeneous, axially parallel magnetic steady field, and a radially directed electric DC field, existing between the outer R-F structure and the inner sole. Under the influence of the radial electric field and the axial magnetic field the electrons in the beam are constrained to rotate in a helical path, with a high beam stiffness and strong focussing, while the external R-F structure is in a favorable position to dissipate the heat generated by impinging electrons.

Other objects, advantages and features of the instant invention will become apparent from a consideration of the following specification taken in conjunction with the accompanying drawings in which:

FIG. 1a is a longitudinal section of the backward wave tube of the instant invention;

FIG. 1b is an enlarged broken-away view of a portion of FIG. 1a;

FIG. 1c is a cross sectional view, partly schematic, of the device shown in FIG. 1a;

FIG. 1d is a cross sectional view of FIG. 1a taken through lines 1d—1d;

FIG. 1e is a sectional view showing a matched termination for the tube depicted in FIG. 1a;

FIGS. 2a and 2b illustrate an alternative R-F structure for use with the backward wave tube illustrated in FIG. 1a;

FIGS. 2c and 2d illustrate two methods of removing the R-F energy from the tube;

FIG. 2e illustrates the position of lossy ceramic material used to terminate the embodiments of this invention shown in FIGS. 2 and 3;

FIGS. 3a and 3b illustrate another R-F structure for use with the tube shown in FIG. 1a; and FIG. 3c illustrates a variation in the R-F structure of FIGS. 3a and 3b.

The R-F structure in FIG. 1a consists of bars 11 which are strapped together to operate in the $\pi$-mode. That is, the R-F electric fields in adjacent wires are 180 degrees out of phase. Disposed centrally within the cylindrical arrangement of wires 11 is sole 12 which is maintained at cathode or zero potential $V_b^-$. All the wires or bars 11 are maintained at a positive D.C. potential $V_a^+$ with respect to sole 12.

The tube as shown in FIG. 1a is connected to be operated as an amplifier. At the gun end of the tube two strip line microwave conductors 24 and 25 are connected to the wires or bars 11 by means of the strapping bars 13. Similarly, at the collector end of the tube, two output strip line conductors 26 and 27 are connected to the strapping bars 13. If the tube is to be operated as an oscillator the outputs 26 and 27 may be removed, and the collector end of the tube is then terminated in its characteristic matching impedance, as shown in FIG. 1e. The oscillator output is then taken over the strip line conductors 24 and 25 at the gun end of the tube.

As can be seen in FIG. 1b, the electron beam 21 is focussed by beam forming electrodes 17 maintained at collector potentials $V_b^-$ and uniform longitudinal magnetic field 20 produced by any suitable means such as coil 29 in which the entire tube is immersed. The cathode 22 is preferably conically shaped with a cone angle of approximately 2 to 5 degrees. This conical shape is important in the operation of the tube in two respects. Firstly, all the electron trajectories of the electrons emitted from the conically shaped cathode 22 are geometrically similar. Consequently, all electrons in a cross section of the beam 21 possess the same angular velocity. The angular velocity is related to the applied, axial magnetic field 20 by Busch's Theorem as:

$$w(r) = \frac{-w_c}{2}\left(1 - \frac{r_{el}^2}{r_s^2}\right)$$

where:

$w(r)$ = angular velocity of the electrons at position $r$.
$w_e$ = Cyclotron angular frequency, $e/m.B_z$
$e$ = charge of an electron
$m$ = mass of an electron
$r_{el}$ = radial position of the electron
$r_s$ = sole radius This relationship shows that space charge waves in the beam 21 are stable; i.e., no growing waves can develop and consequently, no beam "break-up" will occur in the angular direction.

Secondly, by virtue of the axial magnetic field 20 and the radial electric field between the bars 11 and the sole 12, the electrons in beam 21 travel on a helical path about the sole 12, with pitch which is essentially determined by the cone angle of the cathode 22. For effective operation of the Rotatron the pitch angle is kept as small as possible in order to obtain a large number of interacting "electronic" wave lengths in a tube of short geometric length. Each revolution of the beam 21 interacts with only half the number of the π-mode strapped bars 11 of the structure, since the R-F field exists between the bars 11 and the R-F potentials on adjacent bars are 180° out of phase. Each electron in the beam will then experience one interaction or energy exchange with the R-F field each time it crosses from a region of positive R-F potential to a region of negative R-F potential. Thus, the total number of interactions or electronic wavelengths which the electron beam experiences as it travels down a tube of a given physical length, is dependent on the number of wires 11 and the pitch of the helical beam 21. It is extremely desirable to provide a large number of electronic wavelengths in a tube of relatively short geometrical length, for the greater the number of electronic wavelengths, the smaller will be the starting oscillation current drawn from the cathode. Consequently, any cathode current in excess of the starting current is converted into output power, and the efficiency of the tube is correspondingly increased.

FIG. 1c shows in cross section the π-mode strapping of the bars 11 and the instantaneous R-F field existing between the sole 12 and the bars 11. Superimposed upon the radial R-F field is the D.C. field originating at the wires or bars 11 and terminating at sole 12. The radial component of the R-F field, designated by lines 24, is responsible for phase focussing, while the angular or azimuthal component of the R-F field, indicated by lines 23, performs energy exchanges with the rotating electrons.

The cross sectional view in FIG. 1d illustrates a preferred method for dissipating the heat generated by electrons striking the bars 11. Beryllium-oxide strips 14 are connected between the bars 11 and outer shield 15 for conducting the heat to the surrounding environment. Beryllium-oxide is particularly well suited for this application since it is an extremely good heat conductor and a superior electrical insulator.

FIG. 1e shows one means of terminating the tube shown and described in connection with FIG. 1 when oscillator operation is desired. Here the collector end of the tube is terminated to prevent reflections by a lossy ceramic 28.

As is common in the art, the lossy ceramic 28 is tapered to provide the proper matching and to prevent reflection.

The operation of the invention may now be described with respect to FIG. 1b. Electrons are emitted from cathode 22 and are initially focussed by focussing electrode 17 and control anode 18. Due to the creation of the electron flux and to the conical shape of the cathode, all electrons will have geometrically similar trajectories and will have the same angular velocity, as the electron beam rotates in the interaction region between bars 11 and sole 12. The electrons in the beam will describe a helical path as they advance along the longitudinal axis of the tube, due to the crossed field effect of the mutually perpendicular magnetic and D.C. fields. The B+ potential applied to the R-F structure and the magnetic field determine the beam position, designated by $r$, which the outer envelope of the helical beam 21 will assume, since the electric force and the magnetic force on the electrons counteract each other and predetermine the equilibrium radius. The radio frequency $w_{rf}$, in synchronism with the angular velocity $w(r)$ of the electrons, is expressed by $w_{rf} = w(r).N/2$ where $N$ = the number of bars 11 in R-F structure. The drift velocity $V_{dr}$ of the electrons in crossed magnetic and electric fields is proportional to the ratio $E_r/B_z$, where $E_r$ = the radial electric DC field and
$B_z$ = the axial magnetic DC field and is equal to $w_{(r)}.r_{el}$ in the unperturbed state; that is, where no R-F field is present. From this it follows to a first approximation that the radio frequency generated is proportional to the voltage applied to the structure, since the radial electric DC field is a linear function of the potential between the structure 11 and the sole 12. As mentioned above, the R-F structure is non-resonant and consequently the excited radio frequency is primarily determined by the applied DC potential if the magnetic DC field is maintained constant. On the other hand, if the DC potential is kept constant the frequency can be altered by varying the magnetic DC field.

The above conditions require exact synchronism between the rotating electron beam and the rotating electromagnetic wave which originates from a standing wave gap-field between the bars 11 of the π-mode strapped structure. As is well known, a standing wave field can be analyzed into two circularly polarized traveling waves which have opposite directions of rotation. The gap field can be further analyzed into Fourier space components. In the case of the Rotatron the rotating electrons interact with the backward wave space harmonic of the rotating electromagnetic wave. Since the R-F structure has no resonant frequency and the rotational motion of the electrons select one frequency in the frequency band of the structure which theoretically extends from zero to infinity, synchronism between the electromagnetic wave and the rotating electrons is automatically sustained.

The radial R-F field is responsible for the phase focussing or bunching of electrons, while the azimuthal R-F field undergoes energy conversion; i.e., the bunched electrons or space charge spokes give up a part of their kinetic energy to the rotating electromagnetic field by induction. The electrons which have been slowed down after giving up kinetic energy, regain their energy from the radially distributed and axially symmetrical potential field in the form of potential energy and speed up again due to the radially and circularly directed motion.

Thus, in a crossed field device, the conversion from potential energy into R-F energy is caused by the reduction in potential energy of electrons as a consequence of their motion in an electric DC field at constant kinetic energy. Inherent in a crossed field device is a conversion efficiency, considerably higher than other known helical beam devices. However, since the energy conversion is due entirely to a transfer of the electrons' potential energy to the R-F field as the electrons move through the radial D.C. field, a majority of the electrons will eventually strike the wires 11. The remainder of the electrons will reach collector 19 where they are absorbed.

The R-F structure described, consisting of bars 11, is highly dispersive. That is, a variation in the D.C. voltage will cause a corresponding shift in the operating frequency. While such a characteristic is desirable in the oscillator operation described, it would be extremely undesirable for conventional amplifier operation where wide-band response is desired. A suitable R-F structure for wide-band amplifier operation would be a helix, coaxial with the sole. In such operation the outputs would of course be matched to the generator and the load.

FIGS. 2 and 3 illustrate two R-F structures suitable for operation at higher frequency ranges. The operation of the tube when each of these structures is employed is essentially similar to that described in connection with FIG. 1. A longitudinal magnetic field, a radial D.C. field, and a conical cathode are still employed, resulting in a helical beam which interacts with the rotating R-F field in a manner previously explained.

The R-F structure shown in FIG. 2a in a cutaway view and in FIG. 2b in cross section consists of a series of resonant cells 33 attached to the interaction interdigital anode 32. Coupling between adjacent cells is provided by slots 31. As in FIG. 1 the entire R-F structure surrounds the centrally disposed sole 12′ which is maintained at zero potential. This structure is designed to operate in the S-band and C-band regions.

Each of the resonant cells 33 can be thought of as a filter, adjusted for a center frequency and having a predetermined pass band. The dimensions of the resonant cells 33 and the interdigital anode 32 determine the dominance of a particular mode, such as the π-mode, having a fundamental backward wave space harmonic. Since the resonant cells are inductively coupled to each other, the backward wave fundamental harmonic will be supported, and oscillations will be sustained.

As in the FIG. 1 embodiment both the input and output sides are matched to the characteristic impedance of the R-F structure. This matching can be readily accomplished by inserting tapered sections of lossy ceramics, or the like, in the first few and last few resonant cells of the R-F structure.

Two possible methods of extracting the R-F energy from the structure are illustrated in FIGS. 2c and 2d wherein reference numerals corresponding to those employed in FIG. 2a designate like parts. In FIG. 2c the energy is extracted by means of a waveguide 34 directly coupled to a resonant cell 33, while in FIG. 2d there is utilized a coaxial line 36 coupled to the structure by means of a loop or probe 35.

FIG. 3a shows a broken away view and FIG. 3b a cross sectional view of an R-F structure adapted for use in the X-band and lower k-band region. The structure consists of a ladder like shaped transmission line 40 having a plurality of slots 42 therein, wrapped around the sole 12″, in association with a ridged waveguide 41 which surrounds the "ladder-line" 40. In this case the spacing between the sole 12″ and the "ladder-line" 40 constitutes the interaction region. The structure is actually wrapped in separate rings around the sole 12″ and each waveguide ring 41 is inductively coupled to the adjacent one by means of circumferential slots 43 or the like. The "ladder-line" is particularly well suited for this application since it contains a large number of slots 42, adjacent slots being 180° out of phase. Thus, the π-mode is supported and a large number of electronic wavelengths per electron revolution will be obtained. Consequently, for reasons discussed in connection with FIG. 1, the starting current will be reduced and the efficiency of the tube will be greatly enhanced.

It is also possible to wrap the "ladder-line" 40 and ridged wave guide 41 in a helical manner about the sole 12″ as shown in FIG. 3c. If the pitch of the helical winding, denoted by the angle φ, is made equal to the pitch of the helical electron beam, the interaction will be optimized. Furthermore, no additional coupling between adjacent sections is required, because in effect a continuous line is provided. The ridged waveguide can be visualized as the thread of a screw, having the same pitch as that of the helical electron beam. The frequency range of the structure is restricted by the resonance of the "ladder-line" as an upper limit and the lower cut-off frequency of the ridged waveguide as a lower limit. The output coupling can be one of those described in connection with FIGS. 2c and 2d.

In summary then, there has been described a backward wave tube having the following advantages with respect to known BW tubes:

(1) The longitudinal magnetic DC field is utilized both for obtaining strong focussing and consequent high beam stiffness and for crossed field operation with attendant high conversion efficiency.

(2) The device can be operated as a backward wave oscillator, as a forward travelling wave amplifier with very high gain and conversion efficiency or as a backward wave amplifier with high gain and high conversion efficiency.

(3) The R-F structure utilized can be extremely wideband and either highly dispersive or practically dispersionless.

(4) Since all the electrons have the same angular velocity and the anode structure is situated outside the annular beam, the beam is stable and no growing space-charge wave can occur.

(5) The device is voltage tunable or magnetically tunable.

(6) The axial velocity of injection can be adjusted within wide limits, independently of the rotational velocity.

(7) The pitch angle of the helical beam is small and consequently the tube length can be reduced and still achieve a large number of electronic wave lengths or interaction cycles and a reduction in the starting oscillation current.

Although particular preferred embodiments of the invention have been shown and described, it is contemplated that other structural configurations may be employed within the scope of the invention as defined in the appended claims.

We claim as our invention:

1. An elongated generally cylindrical crossed-field traveling wave tube comprising:

(a) an elongated R-F structure generally concentric with the longitudinal axis of said tube, (b) an elongated zero potential sole, said sole being concentric with and of same length as said R-F structure but of a different diameter with said sole and said R-F structure defining a generally cylindrical interaction region between said R-F structure and said sole.

(c) coaxial conical cathode means for emitting electrons having trajectories which are geometrically similar, said cathode means being placed at one end of said tube outside of said interaction region, the small end of said cathode facing said interaction region, (d) first means for applying a longitudinal steady magnetic field to the entire foregoing structure to obtain high beam stiffness including said cathode means and said interaction region, (e) second means for applying a radial D-C electric field to the region surrounding said cathode means, (f) third means for applying a longitudinal D-C electric field to the region between said cathode means and said interaction region, and (g) fourth means for applying a radial D-C electric field to said interaction region whereby electrons leaving said cathode receive circumferential acceleration, as well as axial and radial acceleration from the moment of leaving said cathode means thereby achieving a high circumferential velocity and low pitch angle thereby allowing the tube length to be reduced while achieving a large number of electronic wavelengths or interaction cycles.

2. The traveling wave tube of claim 1 wherein the R-F structure comprises a plurality of π mode strapped bars.

3. The invention according to claim 1 wherein said R-F structure comprises an interdigital anode wrapped cylindrically about said sole, the spacing between the fingers of said anode defining resonant cells.

4. The invention according to claim 3, wherein coupling between adjacent resonant cells is provided by circumferentially disposed slots.

References Cited

UNITED STATES PATENTS

| | | | |
|---|---|---|---|
| 2,610,308 | 9/1952 | Touraton et al. | 315—3.5 |
| 2,632,130 | 3/1953 | Hull | 315—3.6 |
| 2,752,523 | 6/1956 | Goodall | 315—3.5 |
| 2,792,519 | 5/1957 | Pierce | 315—3.5 |
| 2,833,956 | 5/1958 | Reverdin | 315—3.5 |
| 2,940,006 | 6/1960 | Cuccia | 315—3.5 |
| 2,949,563 | 8/1960 | Willshaw | 315—39.3 |

JAMES W. LAWRENCE, *Primary Examiner.*

V. LAFRANCHI, *Assistant Examiner.*